United States Patent

[11] 3,589,401

| [72] | Inventor | Ray S. Harding<br>Racine, Wis. |
|---|---|---|
| [21] | Appl. No. | 843,093 |
| [22] | Filed | July 18, 1969 |
| [45] | Patented | June 29, 1971 |
| [73] | Assignee | J. I. Case Company |

[54] PRESSURE MODULATING VALVE
7 Claims, 6 Drawing Figs.

[52] U.S. Cl. ................................................ 137/625.67,
251/324
[51] Int. Cl. .................................................. F16k 11/07
[50] Field of Search ........................................ 137/625.25,
625.67, 625.68, 625.69; 251/324, 325

[56] References Cited
UNITED STATES PATENTS
2,634,679 4/1953 Kern ............................ 137/625.69 X
3,009,482 11/1961 Schwartz ...................... 137/625.67
2,642,614 10/1954 Mc Leod ...................... 137/625.25 X
3,473,566 10/1969 Peppel .......................... 137/625.69 X
3,477,472 11/1969 Mercier ........................ 137/625.69 X

*Primary Examiner*—Henry T. Klinksiek
*Attorney*—Dressler, Goldsmith, Clement & Gordon ABSTRACT: A control valve for controlling the pressure of a fluid to a control port on a valve bore. The valve spool cooperates with the valve bore to define an axial flow path located between the inlet and return ports of the control valve and which is axially shiftable by moving the valve spool. With the valve spool in an operative position, the flow path bridges the control port so that the pressure in the control port is a function of the position of the flow path relative to the inlet and return ports.

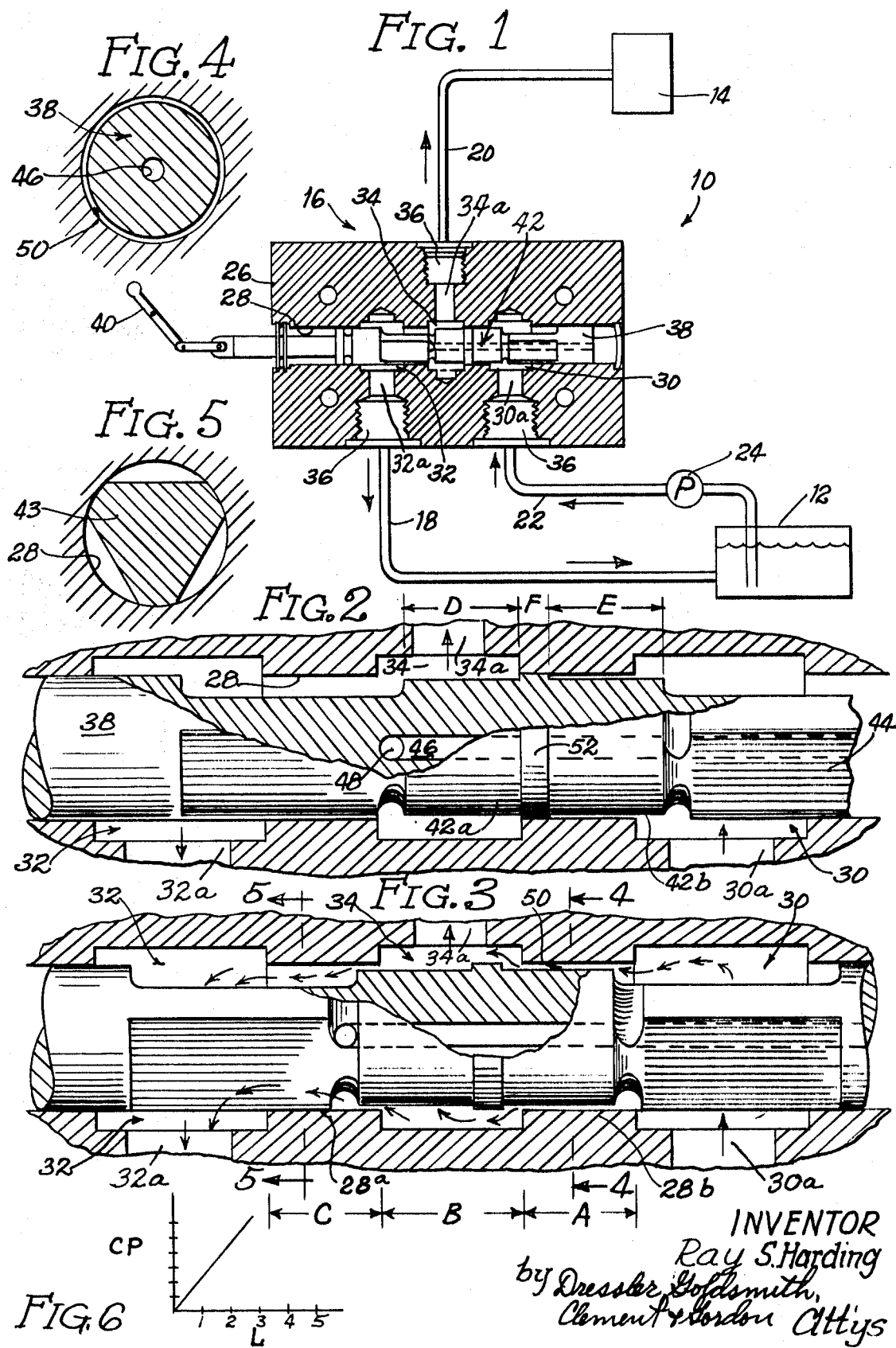

PRESSURE MODULATING VALVE

BACKGROUND OF THE INVENTION

The present invention relates generally to fluid control systems and more particularly an improved control valve which is capable of regulating the pressure of fluid supplied to a control port with a substantially constant inlet pressure to the control valve.

While pressure modulating valves have been known for years, most of the commercially available valves are rather complicated in construction and in many instances are completely automated in function so as to require adjustment of the control valve whenever any variations in the parameters of the fluid control system are desired. Furthermore, most of the control valves presently commercially available do not readily lend themselves to manual operation so that the modulated pressure of the fluid cannot readily be established by the operator.

Thus, there still remains a need for a simple and effective manner of modulating the pressure of fluid to a control port with a constant pressured fluid source being supplied to a control valve.

SUMMARY OF THE INVENTION

The present invention provides such a control valve which is capable of manual operation so that the modulated pressure of the fluid supplied to the control port of a valve is entirely at the discretion of the operator. The control valve of the present invention includes a housing having a valve bore which has axially spaced inlet and return ports and a control port interposed intermediate the inlet and return ports. The valve bore slidably receives a valve spool which cooperates with the bore to define an axial, restricted flow path located between the inlet and return ports. The flow path is capable of being axially shifted relative to the ports in a manner that the pressure of fluid at the control port varies with the position of the flow path relative to the control port.

According to a specific embodiment of the present invention, the control valve is capable of supplying pressured fluid at a control port which is linearly proportional to a substantially constant inlet pressure of the fluid being supplied and is dependent upon the axial position of the valve spool relative to the valve bore.

BRIEF DESCRIPTION OF THE DRAWINGS

FIG. 1 is a schematic view of a hydraulic control system having a control valve incorporated therein which is shown in section;

FIG. 2 is an enlarged fragmentary sectional view of a portion of the valve spool and the valve housing;

FIG. 3 is a view similar to FIG. 2 showing the valve spool in an operative position;

FIG. 4 is a transverse sectional view taken generally along lines 4-4 of FIG. 3;

FIG. 5 is a transverse sectional view taken generally along lines 5-5 of FIG. 3; and FIG. 6 is a diagrammatic illustration showing the relationship of the pressure at the control port in relation to the position of the valve spool.

DETAILED DESCRIPTION

FIG. 1 of the drawings schematically illustrates a fluid control system 10 including a fluid reservoir 12 and a fluid operated device 14. The fluid control system further includes a control valve 16 connected to the reservoir by a conduit 18 and to the fluid operated device by a second conduit 20. Pressured fluid is supplied to the control valve from the reservoir through a further conduit 22 having a pump 24 incorporated therein.

According to the present invention, the control valve 16 is capable of modulating the pressure of the fluid in conduit 20 as well as fluid operated device 14 while having a substantially constant pressure supplied to the control valve from the pump 24.

For this purpose, the control valve 16 includes a housing 26 having an axially extending valve bore 28 defined therein which has axially spaced inlet and return ports 30a and 32a communicating with respective circumferentially extending grooves 30 and 32 and a control port 34a disposed between the inlet and the return port and communicating with circumferentially extending groove 34. The respective conduits or conduit means 18, 20 and 22 are connected to the ports 30a, 32a and 34a through suitable couplings 36. The control valve 16 further includes a valve spool 38 slidably disposed in the bore 28 and axially shiftable from the neutral position shown in FIGS. 1 and 2 by a control lever 40.

According to the present invention, the valve spool 38 and the valve bore 28 cooperate to define an axial, restricted flow path between the inlet port and the return port of the control valve. The restricted flow path is axially shiftable by movement of the valve spool 38 within the bore 28 and, when the valve spool is moved from the neutral position, the restricted flow path bridges the control port.

The cooperating means on the valve spool includes an elongated land 42 which has a cross-sectional configuration identical to that of the cross-sectional configuration of the valve bore 28 and which is slightly smaller in diameter, for a purpose which will become apparent hereinafter. The valve spool 38 further includes reduced area portions, generally illustrated as triangular sections 43, 44 which are respectively disposed on opposite ends of the land 42 and which provide unrestricted flow between the inlet and return ports and the opposite ends of the land 42, for a purpose which will become apparent hereinafter. The valve spool also includes an axially extending opening 46 which communicates at one end of the valve spool with the valve bore and at its opposite end with a transversely extending opening 48 which communicates at its outer end with the chamber defined between the valve bore 28 and the reduced area portion 43.

The peripheral surface of the land 42 cooperates with the internal surface of the bore 28 to define the above-mentioned axially extending restricted flow path 50. As can be appreciated, the size of the flow path shown in FIGS. 2 and 3 has been considerably enlarged for purposes of illustration. Since the land 42 is integral with and forms part of the valve spool 38, axially shifting of the valve spool 38 within the bore 28 will cause movement of the flow path 50 relative to the inlet and return ports.

The specific illustrated embodiment of the present invention discloses a control valve defining a restricted flow passage 50 which is capable of varying the pressure at the control port linearly with respect to a constant input pressure supplied to the inlet port 30a. Also, while not necessary to practicing the present invention, the illustrated embodiment incorporates mechanism for blocking the flow in the restricted flow path when the valve spool 38 is moved to a neutral condition. This mechanism for blocking the flow includes an enlarged sealing section 52 defined on the land 42 which divides the land into controlling land portions 42a and 42b. The section 52 has a cross-sectional configuration and area equal to the cross-sectional configuration and area of the valve bore 28. Thus, when the valve spool is in a predetermined or neutral position shown in FIGS. 1 and 2, the enlarged section 52 will block the flow between the inlet port 30a and the control port 34a.

Applicant has found that by specifically dimensioning the space between the inlet port, the control port and the return port, and the cross-sectional area of the restricted flow path 50, the pressure of the fluid at the control port 34a will become a function of the position of the valve spool relative to the bore.

For a specific example, applicant has illustrated a specific valve construction which incorporates mechanism for blocking flow when the valve in in a neutral position and in which the pressure at the control port is linearly proportional to the position of the valve spool within the bore and the pressure of the fluid at the inlet port 30a. In order to obtain this linear relationship, the enlarged section 52 on land 42 has axially spaced ends which divide the land 42 into portions 42a and 42b which are equal in length. These dimensions are designated by the letters D and E in the accompanying drawings while the axial length of the enlarged portion for section 52 has been designated by the letter F.

Also, in order to obtain the above-mentioned linear relationship between the pressure at the control port and the pressure at the inlet port, the axial length of the groove 34 which communicates with control port 34a, which is designated by the letter B (FIG. 3), must be equal to the combined length of one of the land portions 42a or 42b and the enlarged section or portion 52. Thus, B equals E plus F. Furthermore, the axial spacing between the one end of the groove 34 and the adjacent end of the groove 30, which is designated by the letter A, and the spacing between the opposite axial end of the groove 34 and the adjacent end of the groove 32, designated by the letter C, must be equal in axial length to each other and have an axial length equal to either of the land portions 42a or 42b.

Thus, the axial length of the land 42 (D+E+F) is less than the axial spacing between the groove 30 and the groove 32 (A+B+C). Also, the axial length of the land 42 is greater than the spacing between (1) groove 30 and the groove 34; and (2) groove 34 and the groove 32.

Assuming that the cross-sectional area of the restricted flow path 50 has been properly configured, dependent upon the length of the flow path, the pressured difference across the length of the flow path and the fluid properties or more particularly the fluid viscosity, to provide a sufficient flow so that the pressure at the head or inlet port end of the land 42 is equal to the pressure supplied by the pump and the pressure at the opposite end of the land 42 is substantially zero. When this condition has been achieved, the pressure at the control port 34a will be dependent upon the relative length of the portions of the flow path which are located on opposite sides of groove 34. Stated another way, the distance the return end of the land 42 overlaps the reduced area section 28 between grooves 32 and 34a will determine the pressure at the control port 34. This relationship has been graphically illustrated in FIG. 6 wherein the reference L designates the amount of overlap described above and the reference CP designates the pressure of the fluid at the control port.

Once a constant flow has been established through the path 50, the flow to the device 14 is substantially zero and the valve spool is in a position other than the neutral position shown in FIG. 2, e.g., such as that shown in FIG. 3, the pressure at the control port may be determined by the following equation:

$$CP = \frac{P_s \times L}{A}$$

where CP is the control pressure, $P_s$ is the pressure of the fluid at the inlet port, A is the axial distance 28b between groove 30 and groove 34, and L is the distance the control land 42 overlaps the portion 28a of the valve bore.

While one specific embodiment of the present invention has been illustrated, it is readily apparent that various modifications may be made without departing from the spirit of the present invention. For example, the control valve has been illustrated as incorporating the enlarged section 52 for blocking the flow in the restricted flow path 50 when the valve spool is in the neutral position. However, it can be appreciated that this particular blocking of the flow may not be necessary in all constructions of the present type. For example, if there is no objection to having a constant bleed flow through the restricted flow path 50, the neutral condition or substantially zero pressure to the controlled device 14 would be achieved by positioning the valve spool to a position where the cross-sectional area between the return port end of the land 42 and the adjacent end of the groove 34 is greater than the cross-sectional area of the restricted flow path 50. When this condition has been achieved, as by the manual control lever 40, the pressure at the control port would be substantially zero since the flow between the control port 34a and the return port 32a would be greater than the flow path between the inlet port and the control port. If such an arrangement were desired, and assuming a linear relationship were desired between the inlet pressure and the pressure at the control port, the axial length of the land 42 would only need to have an axial length equal to twice the dimension "A" or the axial length of the bore section 28b.

If other than a simple linear relationship between the position of the valve spool in the bore, the inlet pressure and the control pressure, various modifications could be made to the various dimensions described above to produce substantially any desired control pressure and spool position curve. By varying the relative length of the portions 42a and 42b of the control land 42, by having unequal lengths of the portions of the valve bore 28a and 28b, and by changing the cross-sectional area of the flow path 50 along the axial length of the flow path, the spool position and control pressure curve could have an infinite number of configurations. Thus, it can be seen that the present control valve provides a simple and effective manner in which the control pressure to a fluid operated device is completely at the discretion of the operator and which may have any number of relationships to the position of a valve spool within a valve bore.

What I claim is:

1. A control valve comprising: a housing having an axial valve bore therein, said bore having first, second and third axially spaced, circumferentially extending grooves in the wall thereof, said first and second grooves defining a first body land therebetween and said second and third grooves defining a second body land therebetween, an inlet port communicating with said first groove and adapted to be connected to a pressured fluid source, a return port communicating with said third groove and adapted to be connected to a reservoir, and a control port communicating with said second groove and adapted to be connected to a fluid operated device; a valve spool slidably received in said bore; the external periphery of said valve spool including a first control land at one end thereof and a second control land at the opposite end thereof, said first control land being positioned adjacent said first body land and said second control land being positioned adjacent said second groove in the neutral position of said valve spool, the external periphery of said valve spool and the internal surface of said valve bore defining a restricted flow path between said inlet and return ports; and means for shifting said valve spool in said bore away from said neutral position to move a portion of said first control land out of alignment with said first body land and to move a portion of said second control land into alignment with said second body land, the pressure at said control port varying linearly as a function that is dependent upon the distance that said second control land is moved relative to said second body land.

2. A control valve as defined in claim 1, in which said valve spool includes a sealing section blocking flow of fluid along said flow path when said spool is in a predetermined position.

3. A control valve as defined in claim 1, and in which said valve spool includes an enlarged sealing section having a transverse configuration corresponding to the transverse configuration of said bore for blocking flow along said path when said valve spool is in a neutral position, and wherein said control lands are reduced area lands on opposite ends of said enlarged section, said enlarged section being disposed in said second groove when said valve is moved from said neutral position to locate portions of respective ones of said reduced lands at opposite ends of said second groove.

4. A control valve as defined in claim 1, in which said control lands each have a cross-sectional area less than the cross-sectional area of said bore, said control lands having a combined length greater than the axial length of said second groove.

5. A control valve as defined in claim 1, in which said second groove has an axial length defining a first dimension and is axially spaced from said first groove by a second dimension, and in which the remote ends of said lands are spaced by an axial length at least equal to the combination of said first and second dimensions, said lands having a cross-sectional area less than the cross-sectional area of said bore.

6. A control valve as defined in claim 5, the further improvement of an enlarged sealing section on said spool, said enlarged section having said control land portions on opposite ends thereof, said control land portions each being equal in length to one of said dimensions, said enlarged section having a cross-sectional area equal to the cross-sectional area of said bore and blocking flow in said flow path when the valve spool is in a predetermined position.

7. A fluid control system as defined in claim 1, in which said second groove has a first axial dimension on said bore, said second groove has one end spaced from said first groove by a second dimension, and said second groove has an opposite end spaced from said third groove by a third dimension, the further improvement of said second and third dimensions being equal and said control lands each comprising a circular land having a constant cross-sectional area less than the cross-sectional area of said bore, said spool having an enlarged section between said lands for blocking flow along said flow path when said valve spool is in a neutral position, said enlarged section dividing said spool into land portions of equal axial length and said land portions each having a length equal to one of said second and third dimensions whereby movement of said valve spool away from a neutral position will cause a linear increase in pressure of fluid to said control device.

PO-1050
(5/69)

UNITED STATES PATENT OFFICE
CERTIFICATE OF CORRECTION

Patent No. 3,589,401　　　　　　　　Dated June 29, 1971

Inventor(s) Ray S. Harding

It is certified that error appears in the above-identified patent and that said Letters Patent are hereby corrected as shown below:

In the References Cited:

Mc Leod "2,642,614" should be --2,692,614 --.

Column 2, line 74, "in" first occurance should be -- is --.

Signed and sealed this 18th day of January 1972.

(SEAL)
Attest:

EDWARD M.FLETCHER,JR.　　　　ROBERT GOTTSCHALK
Attesting Officer　　　　　　　Acting Commissioner of Patents